United States Patent [19]

Whiteside

[11] Patent Number: 4,774,535
[45] Date of Patent: Sep. 27, 1988

[54] INSTANT TYPE CAMERA WITH MANUALLY OPERABLE MEANS FOR REMOVING FILM UNITS FROM IMBIBITION CHAMBER

[75] Inventor: George D. Whiteside, Lexington, Mass.

[73] Assignee: Polaroid Corporation, Cambridge, Mass.

[21] Appl. No.: 137,671

[22] Filed: Dec. 24, 1987

[51] Int. Cl.⁴ .................. G03B 17/52; G03B 17/02
[52] U.S. Cl. ................................ 354/86; 354/212
[58] Field of Search ............... 354/83, 84, 85, 86, 354/173.1, 212, 288

[56] References Cited

U.S. PATENT DOCUMENTS

| | | |
|---|---|---|
| 2,794,377 | 6/1957 | Fairbank . |
| 3,165,040 | 1/1965 | Hamilton ........................... 354/86 |
| 3,426,664 | 2/1969 | Norton ............................... 354/86 |
| 3,537,370 | 11/1970 | Wareham ........................... 354/86 |
| 4,265,525 | 5/1981 | Stella et al. ....................... 354/86 |
| 4,664,497 | 5/1987 | Johnson, et al. .................. 354/86 |
| 4,723,140 | 2/1988 | Whiteside et al. ................ 354/86 |

Primary Examiner—A. A. Mathews
Attorney, Agent, or Firm—Alfred E. Corrigan

[57] ABSTRACT

An instant type camera is provided with an imbibition chamber having (1) a window in one wall thereof through which an exposed and developed film unit may be viewed and (2) an egress through which an exposed and developed film unit may be manually advanced to the exterior of the camera by actuation of a film pusher assembly. An opaque shade is mounted for movement between an operative position, in which it prevents entry of light into the imbibition chamber during a time period when an image in the film unit is being developed, and an inoperative position in which the window is uncovered. The shade includes means which prohibits operation of the film pusher assembly when the shade is in its operative light blocking position.

5 Claims, 3 Drawing Sheets

INSTANT TYPE CAMERA WITH MANUALLY OPERABLE MEANS FOR REMOVING FILM UNITS FROM IMBIBITION CHAMBER

RELATED APPLICATION

This application is related to the copending application Ser. No. 137,669 filed on even date herewith by B. K. Johnson and G. D. Whiteside and entitled "Camera Having Disconnectible Manual Controls For Film Unit Removal Assembly and a Shade Assembly."

BACKGROUND OF THE INVENTION

This invention relates an instant type camera having means for preventing the movement of an exposed film unit from an imbibition chamber into the ambient light until its image has been sufficiently developed.

Cameras of the instant type having an imbibition chamber into which an exposed film unit may be moved and stored until its latent image has been sufficiently developed to permit its movement into the ambient light are generally well known. For example, reference may be had to U.S. Pat. Nos. 3,426,664 and 3,537,370 wherein film units of the instant type are sequentially exposed and moved to a lighttight chamber in which a previously applied layer of a liquid is allowed to imbibe layers of the film unit for a time sufficient to produce a visible image in the film unit. Each of the storage chambers includes a door which may be opened to permit removal of the exposed film unit. However, no provision is made for viewing the image in the film unit without opening the door to the storage chamber. Further, no means are provided for preventing premature opening of the door, i.e., opening the door before the developing image has reached the state wherein it is no longer susceptible to being further exposed by ambient light.

U.S. Pat. No. 2,794,377 shows an instant type camera having an imbibition chamber in which a film unit is maintained in a light free environment until its image has been developed. The chamber includes a door which may be opened for removal of a positive sheet of the film unit, only after the emerging image in the film unit is no longer susceptible to being adversely affected by the ambient light. Again, no provision is made to view the image in the film unit located in the chamber without opening the door; nor can a plurality of film units be stored within the imbibition chamber.

U.S. Pat. No. 4,664,497 shows an instant type camera which addresses and solves most of the problems enumerated above. Specifically, the patent shows an instant tpye camera having an imbibition chamber for retaining one or more exposed film units in a light free environment during development of a latent image, a window through which the developed image may be viewed, and means for removing the film units from the imbibition chamber. However, it is possible for the user of this camera to manually actuate the means for removing a film unit from the imbibition chamber before its developing or emerging image is ready to be exposed to the ambient light.

SUMMARY OF THE INVENTION

The present invention relates to a self-developing or instant type photographic apparatus, e.g., a camera, having a lighttight imbibition chamber in which an exposed film unit is adapted to remain until its latent image has been substantially transformed into a viewable image. The apparatus includes a housing enclosing a film chamber having structure for locating and supporting a film assemblage in position for the sequential exposure of a plurality of film units located therein. Located rearwardly or below the film assemblage supporting structure is a chamber which is adapted to receive an exposed film unit, subsequent to a processing liquid being spread across a layer thereof, and maintain it in a lighttight environment until the processing liquid has sufficiently imbibed the film unit to cause the formation of a visible image. The apparatus includes a battery operated motor mounted adjacent one end of the film assemblage supporting structure and means for advancing an exposed film unit from the assemblage's film cassette, around the motor and then to the lighttight imbibition chamber. The aforementioned means includes a cantilevered member having a free end which is adapted to move an uppermost film unit from the film cassette; laterally spaced pairs of superposed friction wheels which are adapted to engage the lateral sides of the exposed film unit and continue its movement away from the film cassette, around the motor, and toward a pair of cylindrically configured superposed rollers; the superposed rollers; and a second cantilevered member for advancing the exposed film unit into the imbibition chamber. The rollers are adapted to rupture a container of processing liquid carried on a leading end of the advancing film unit and spread its contents across a layer thereof to initiate the formation of a visible image therein by a diffusion transfer process. As the exposed film unit leaves the bite of the rollers, its trailing end is located in a position to be engaged by the second cantilevered member for subsequent movement into the imbibition chamber.

The apparatus further includes a loading door through which a film assemblage may be located on the aforementioned supporting structure. The loading door, which comprises one of the walls of the imbibition chamber, has a window therein through which the visible image in a film unit located within the imbibition chamber may be viewed without opening the loading door. Such window is ordinarily rendered lighttight by a blind or shade which is movable from its operative position covering the window, to an inoperative position wherein the film unit within the chamber may be viewed. The blind is maintained in the operative position by a latch until the formation of a visible image within the last exposed unit to enter the imbibition chamber has been substantially formed. After the formation of the visible image, a timing circuit momentarily energizes a solenoid to move the latch to a position wherein the blind may be moved to its inoperative position.

The imbibition chamber is also provided with an egress through which the film units located therein may be moved as a unit to the exterior of the photographic apparatus. The egress is adapted to be light sealed by a pivotally mounted door which is spring biased into its closed or light sealing position. A film pusher assembly having a manually actuatable tab is provided for moving all of the film units located within the imbibition chamber toward the egress while simultaneously moving the pivotally mounted door into an open position.

The apparatus further includes a member which extends from the shade to prevent the user of the photographic apparatus from prematurely moving the manually actuatable tab in a direction to move an exposed, but not fully processed film unit, through the egress and into the ambient light. This member is adapted to overlie the manually actuatable tab when the shade is in its operative position.

An object of the invention is to provide photographic apparatus of the instant type with an imbibiton chamber having a window through which the image in the last film unit to be exposed and positioned therein may be viewed, such window being covered in a lighttight manner during the time period that the latent image within the exposed film unit is still subject to being further exposed by ambient light entering such chamber by the window, and means for preventing movement of such a film unit from the imbibition chamber to the exterior of the apparatus until the end of such time period.

Another object of the invention is to provide such an apparatus with means for automatically uncovering the window of the imbibition chamber at the end of a predetermined time period, such time period starting with the application of a processing liquid to the exposed film unit and ending when the forming image within the film unit is no longer subject to be adversely affected by light entering the chamber via the window.

Other objects of the invention will in part be obvious and will in part appear hereinafter.

The invention comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be taken in connection with the accompanying drawings wherein.

DETAILED DESCRIPTION OF THE INVENTION

Figure 1:
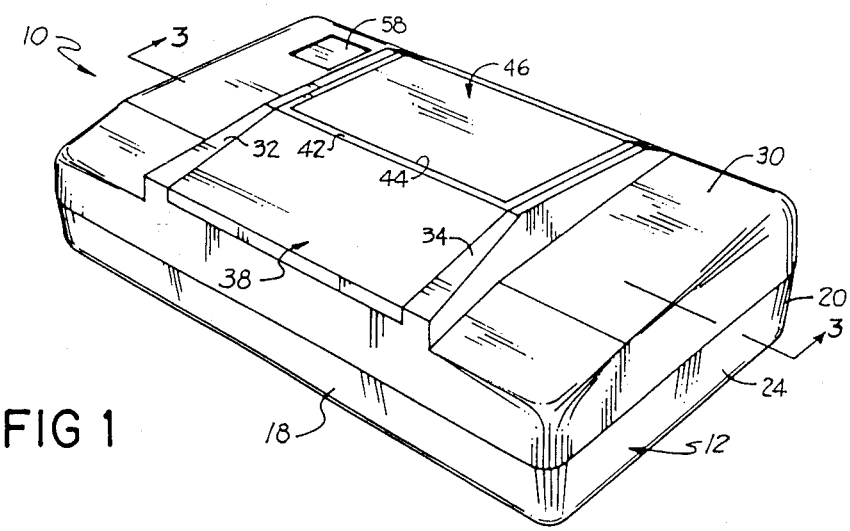
FIG. 1 is a perspective view of a folding instant type camera which incorporates the present invention, the camera being shown in a folded condition.

Reference is now made to the drawings wherein is shown photographic apparatus in the form of a folding camera 10 of the instant or self-developing type. The camera 10 includes a first or main housing 12 having a loading door 14 in a bottom wall 16 thereof (see FIG. 4). The first housing 12 also includes front and rear walls 18 and 20, respectively, and end walls 22 and 24. The door 14 is pivotally connected to the end wall 22 of the main housing 12 by a hinge (not shown) which is generally parallel with the axis of the camera's objective lens 28 and perpendicular to the forward and rear walls 18 and 20. The main housing 12 further includes a top wall 30 having a pair of spaced flanges 32 and 34 extending upwardly therefrom so as to define a recess 36.

Figure 2:
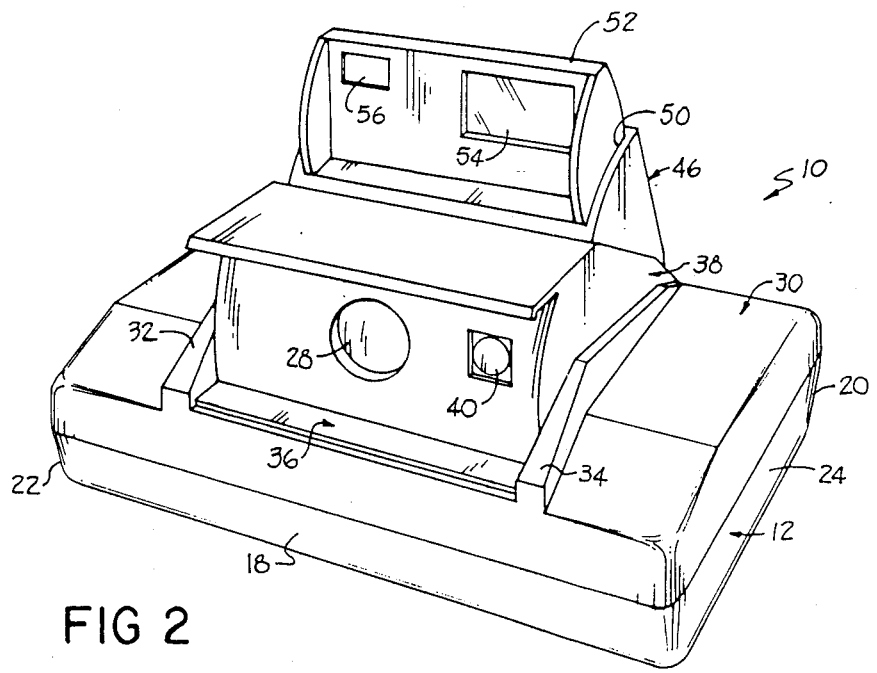
FIG. 2 is a perspective view showing the camera of FIG. 1 in an extended operative condition.

The camera 10 further includes a second housing 38 which is pivotally coupled to the first housing 12 about an axis (not shown) which is generally parallel with the rear wall 20 for movement between an inoperative position (see FIG. 1), wherein it is nested within the recess 36, and its operative position, as shown in FIG. 2. The second housing 38 supports the aforementioned objective lens 28, a shutter assembly, and a photocell window 40. A top wall 42 of the second housing includes a recess 44 which is adapted to receive a third housing 46 of the camera 10 when the camera is being collapsed or folded.

The third housing 46 is pivotally coupled to the rear wall 20 of the first housing 12 about a horizontal axis (not shown) which is generally parallel with the rear wall 20. The third housing 46 is provided with a recess 50 for pivotally receiving therein a fourth housing 52.

The fourth housing 52 supports a source of artificial illumination such as a strobe 54, and a ranging window 56. The fourth housing 52, as well as the second and third housings 38 and 46, is biased into the erect position shown in FIG. 2. Further, the fourth section 52 is adapted to be nested within the recess 50 prior to the third housing 46 being moved into the recess 44.

When the various housings are in the positions show in FIG. 2, actuation of an exposure cycle initiation button 58 (see FIG. 1) located within a recess in the top wall 30 of the first housing 12 is effective to cause image bearing light rays to enter the camera 10 via the lens 28 and be reflected downwardly by a mirror (not shown) onto a film unit 62. For more specific details of the camera 10, reference may be had to the copending application Ser. No. 028,457 filed Mar. 20, 1987, now U.S. Pat. No. 4,723,140, and assigned in common herewith.

The camera 10 is adapted to receive a film assemblage of the type which includes a film cassette 60 having therein a stack of the film units 62 which is resiliently biased by a spring 64 toward a forward wall 66 of the cassette 60 so as to locate the uppermost film unit 62 adjacent to an exposure aperture 68 in the wall 66. The film units 62 are of the integral self-developing or instant type and include a rupturable pad 70 of processing liquid at their leading ends and a trap 72 at their trailing end for receiving any excess processing liquid, as is well know in the art. The camera 10 includes a plate 74 for supporting the film cassette 60 in a position for the sequential photographic exposure of the film units 62. The plate 74 includes an upwardly curved end section 76 for engaging a leading end wall 78 of the film cassette 60 and an upwardly standing flange 80 for engaging a trailing end wall 82 of the film cassette 60, thereby properly locating the film cassette 60 relative to the reflected optical axis of the objective lens 28.

Figure 3:
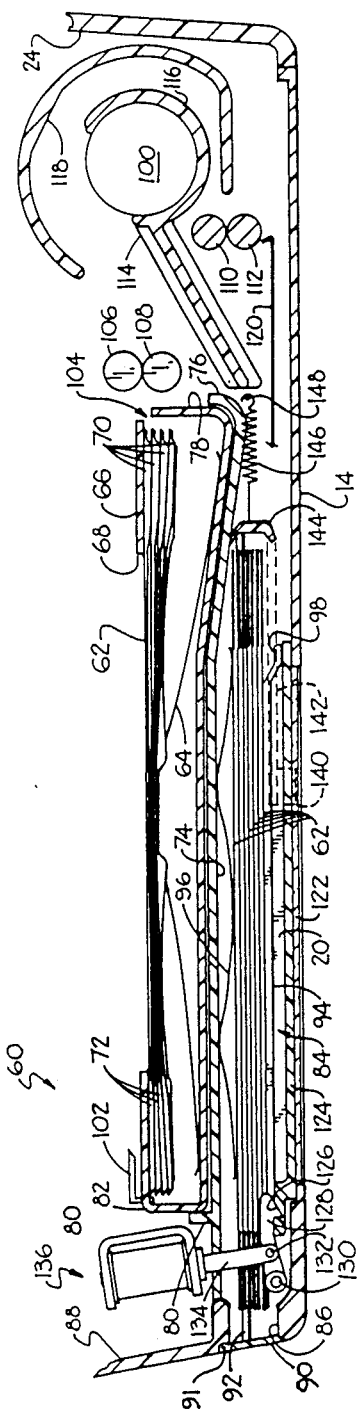
FIG. 3 is an enlarged cross sectional view, partly in section, of the camera, taken generally along the line 3—3 of FIG. 1, the upper portion of the camera being omitted for reasons of clarity.

The camera 10 also includes a lighttight imbibition chamber 84 which is defined in part by the loading door 14, the support plate 74, the forward and rear walls 18 and 20 and the end wall 22 of the first housing 12. The imbibition chamber 84 provides a lighttight environment in which exposed film units 62 may be located during the period that the aforementioned processing liquid is being imbibed by one or more layers of the film unit 62. Exit of the film units 62 from the imbibition chamber 84 may be had by way of an egress opening 86 formed in an upturned end 88 (FIG. 3) of the loading door 14, such opening being rendered lighttight by a door 90 which is pivotally coupled to the upturned end 88 about a pin 91 and is resiliently biased into its closed position wherein it light seals the opening 86. A flange 94 (only one shown) extends inwardly for a short distance from each of the walls 18 and 20 of the imbibition chamber 84 for supporting the exposed film units 62, as shown in FIG. 3. A spring 96 is mounted on the supporting wall 74 for frictionally maintaining the exposed film units in place. Each of the flanges 94 is provided with a downwardly turned portion 98 at one end thereof which functions as a ramp to guide the leading ends of the exposed film units 62 up onto the flanges 94.

Subsequent to the exposure of a film unit 62, a motor 100 is energized to drive a film advancing member 102 in a reciprocating manner to engage the exposed film unit by its retailing edge and advance it to the exterior of the film cassette 60 via an exit opening 104. As the exposed film unit 62 emerges from the film cassette 60 it enters the bite of laterally spaced pairs (only one pair being shown) of motor driven friction wheels 106 and 108. The wheels 106 and 108 engage lateral sides of the exposed film unit at areas outside its picture area, and outside of the ends of the processing liquid container 70. The two pairs of friction wheels 106 and 108 continue the movement of the exposed film unit 62 until its leading end is located in the bite of a pair of motor driven rollers 110 and 112 having a length substantially equal to the width of the exposed film unit 62. During such movement, the leading end of the exposed film unit 62 engages a pair of laterally spaced ramps (only one shown) 114 of a motor support 16 and is deflected upwardly into engagement with a curved plate 118 which guides the exposed film unit 62 around the motor 100 and its support 116 and directs it into the bite of the rollers 110 and 112. The rollers 110 and 112 continue the movement of the exposed film unit 62 toward the imbibition chamber 84 while simultaneously rupturing the container 70 of processing liquid and spreading its contents between layers of the film unit 62 to initiate the formation of a visible image within the film unit via a diffusion transfer process. As the exposed film unit 62 emerges from between the rollers 110 and 112, its leading end engages the underside of the ramp 114 and is deflected downwardly and then along a second cantilevered film advancing member 120 until it rides up the ramps 98 and partially onto the flanges 94 in the imbibition chamber 84. At this point, the trailing end of the film unit 62 containing the trap 72 emerges from between the rollers 110 and 112 and snaps downwardly into engagement with the free end of the film advancing member 120 as the exposed film unit 62 attempts to return to its original planar configuration. The film advancing member 120 is now driven by the motor 100 in a reciprocating manner so as to engage the exposed film unit 62 by its trailing edge and continue its movement up onto the flanges 94 where it will remain in a lighttight environment for a predetermined period of time until the processing liquid has been sufficiently imbibed by layers of the film unit. As stated previously, the predetermined period of time starts substantially at the time that the processing liquid is spread across the exposed film unit and ends when the emerging image within the exposed film unit 62 will no longer be substantially adversely affected by any ambient light which may enter the imbibition chamber 84 via a viewing window 122 located within the loading door 14. The viewing window 122 has dimensions which generally are the same as those of the image area in the exposed film unit 62.

The viewing window 12 is generally covered in lighttight relation by an opaque curtain or blind 124 thereby maintaining the lighttightness of the imbibition chamber 84. The blind 124 is provided with an aperture 126 at one end thereof for receiving a free end of a latch 128.

The latch 128 is adapted to releasably maintain the blind 124 in its operative light blocking position against the bias of a spring (not shown) which in turn is adapted to move the blind 124 to the right into its inoperative position wherein the image in the exposed film unit 62 may be viewed. The latch 128 is pivotally coupled at 130 to a fixed portion of the camera 10 and at 132 to an arm 134 of a solenoid 136. The solenoid 136 is temporarily energized at the end of the aforementioned predetermined period of time, e.g., thirty seconds, so as to pivot the latch 128 in a counterclockwise manner, as viewed in FIG. 3, thus releasing the blind 124 for automatic movement into its inoperative position. Alternatively, the blind 124 could be provided with a manually actuated member for moving the blind 124 into its inoperative position subsequent to the actuation of the latch 128.

After the image in the exposed film unit 62 has been viewed through the uncovered window 122, the operator of the camera 10 may either leave it in the imbibition chamber and continue to photograph subjects, or remove the exposed film unit 62 for closer inspection. To remove the exposed film unit 62 from the imbibiton chamber 84, the operator merely moves a button 140, to the left as viewed in FIG. 4. The button 140 is attached to a slide plate 142 having an inwardly turned film engaging end 144 at one end and a rod 92 at its opposite end. As can be seen in FIG. 3, such movement of the film engaging end 144 by the button 140 is effective to (1) move all of the film units (six being shown) from the imbibition chamber 84 via the opening 86 to a position whereat the operator may grasp them and complete their removal while (2) simultaneously moving the left end of the rod 92 into engagement with the door 90 so as to open the latter. A spring 146 having one end attached to the film engaging end 144 and its opposite end attached to a pin 148 extending inwardly from a wall of the imbibition chamber 84 is provided for returning the film engaging end 144 to the position shown in FIG. 3. If the operator desires to leave the exposed film units 62 within the imbibition chamber and continue photographing subjects, actuation of the exposure cycle initiation button 58 not only actuates the shutter but also completes a circuit to the motor 100. The motor 100 in turn drives the various elements described above for advancing the newly exposed film unit 62 from the cassette 60 to the bottom of the stack of film units 62 already in the imbibition chamber 84. The motor 100 also drives suitable means such as a cam (not shown) which drives the blind 124 back into latched relation with the latch 128 thereby rendering the imbibition chamber 84 lighttight.

Figure 4:
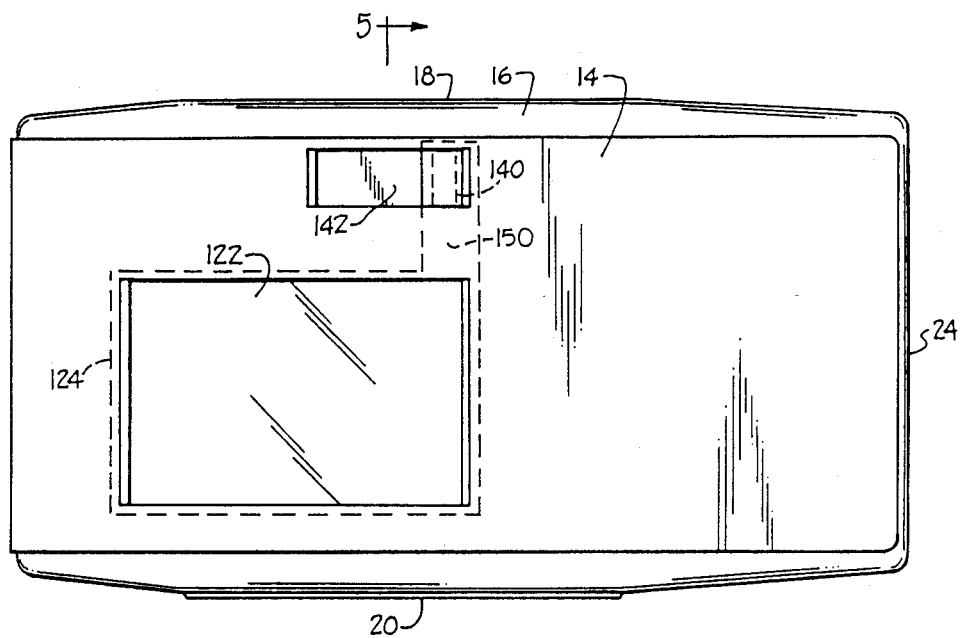
FIG. 4 is a bottom view of the camera.
Figure 5:
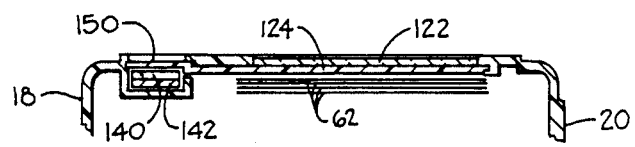
FIG. 5 is a partial cross sectional view taken along the line 5—5 of FIG. 4.

In order to prevent the operator of the camera 10 from prematurely or accidentally moving the tab or button 140 to the left, as viewed in FIG. 4, the blind 124 is integrally formed with an extension 150. As best seen in FIG. 5, the extension 150 is located in a plane slightly above that of the blind 124 and is adapted to be located in overlying relation to the button 140 so as to interfere with the manual operation of the latter when the blind 124 is located in its operative positon, as shown in FIG. 4. When the aformentioned predetermined period of time has expired and the blind 124 has been moved to the right, the extension 150 is out of interference or overlying relation to the button 140, thus permitting the operator to manually actuate the button 140.

After all of the film units 62 have been exposed and removed from the imbibition chamber 84, the empty film cassette 60 may be removed by unlatching and pivoting the loading door 14 in a clockwise manner about its hinge (not shown). As the loading door 14 is pivoted toward its open position it carries therewith among other elements, the support plate 74 carrying the film cassette 60, the second film advancing means 120, the blind 124, the solenoid 136 and the slide plate 142, end 144, spring 146 and pin 148, thereby providing easy access to the fixed structure such as the friction wheels 106 and 108 and the rollers 110 and 112.

Since certain changes may be made in the above described apparatus without departing from the scope of the invention herein involved, it is intended that all matter contained in the above description or shown in the accompanying drawings shall be interpreted as illustrative and not in a limiting sense.

What is claimed is:

1. Photographic apparatus comprising:

means for supporting a film cassette containing a plurality of film units of the instant type in position for their sequential exposure;

means for defining an imbibition chamber, said means including a window through which an exposed and developed film unit may be viewed, and an egress through which a film unit may be advanced to the exterior of said apparatus;

means for advancing an exposed film unit into said imbibition chamber, said advancing means including means for spreading a processing liquid across a layer of the exposed film unit so as to initiate the formation of a visible image therein;

first means for preventing the entry of light, actinic to an exposed film unit, into said imbibition chamber via said egress;

second means for preventing the entry of light, actinic to an exposed film unit, into said imbibition chamber via said window, said second means being mounted for movement between an operative light blocking position in overlying relation to an exposed film unit, in which said imbibition chamber is substantially lighttight, and an inoperative position in which a film unit containing a visible image may be viewed through said window;

means, actuatable after a predetermined period of time commencing with the exposure of a film unit, for releasing said second means for movement toward said inoperative position;

means for engaging an exposed film unit located within said imbibition chamber and moving it, at least partially, to the exterior of said apparatus via said egress;

manually operable means for actuating said film unit engaging means; and means extending from said second means into interference with the operation of said manually operable means when said second means is in said operative position, and out of interference therewith when said second means is in said inoperative position, whereby said manually operable means may be actuated only when said second means is out of said operative position.

2. Photographic apparatus as defined in claim 1 wherein said predetermined period of time is at least equal to the time required for the processing liquid to develop a latent image within the film unit to a state in which it is no longer susceptible to being adversely affected by light entering said imbibition chamber via said window.

3. Photographic apparatus as defined in claim 2 wherein said means extending from said second means comprises an extension of said second means which is constructed to overlie said manually operable means when said second means is in said operative position.

4. Photographic apparatus as defined in claim 3 wherein said film unit engaging means includes means for moving said first means to a position in which movement of an exposed and developed film unit toward the exterior of said photographic apparatus is facilitated.

5. Photographic apparatus as defined in claim 3 wherein said first means is constructed to prevent a second exposed film unit entering said imbibition chamber from moving an exposed film unit already located in said imbibition chamber through said egress due to frictional contact between the two film units.

* * * * *